Jan. 28, 1969  J. D. FREEDMAN ET AL  3,424,418
AUTOMATICALLY RETRACTABLE COAT HOOK
Filed Feb. 14, 1967

JULIUS RADO
JEROME D. FREEDMAN
INVENTORS

BY
John R. Faulkner
E. Dennis O'Connor
ATTORNEYS

United States Patent Office 3,424,418
Patented Jan. 28, 1969

3,424,418
AUTOMATICALLY RETRACTABLE COAT HOOK
Jerome D. Freedman, Dearborn, and Julius Rado, Birmingham, Mich., assignors to Ford Motor Company, Dearborn, Mich., a corporation of Delaware
Filed Feb. 14, 1967, Ser. No. 616,030
U.S. Cl. 248—216                                                    1 Claim
Int. Cl. B60r 27/00

ABSTRACT OF THE DISCLOSURE

A coat hook assembly mounted on a vehicle body interior panel. The coat hook assembly has a hollow housing slidingly receiving a shaft terminating in a protruding hook end. The shaft is axially spring biased into the housing wherein the hook end when not in use is substantially flush with the panel surface. The hook end includes a cam surface through which a force may be exerted to overcome the spring force to urge the shaft into an extended position.

Background of the invention

Current design practice dictates that coat hooks mounted in the interior of motor vehicles not protrude a substantial distance from the surrounding structural panel. Also, it is desired that the outermost extremity of such coat hooks have a relatively large cross-sectional area in order to distribute impact forces caused by a mass impacting against this area.

This invention provides an automatically retractable coat hook having a relatively flat extremity that almost is flush with the adjacent mounting structure when not in use and that conveniently assumes an extended position when an article such as a coat hanger is hung therefrom. The coat hook automatically retracts into its normal position when the article is removed.

Brief summary of the invention

An automatically retractable coat hook for supporting an article from a structure and constructed in accordance with this invention has a retracted position and an extended position and comprises a substantially horizontal hollow elongated member secured to said structure. Shaft means for supporting the article slidingly extends into the hollow member so that one extremity of the shaft protrudes from the member. This extremity has formed thereon a transversely extending flange that serves as a hook. Resilient means are located within the hollow member and operatively bear on the shaft and the member, thereby exerting a force biasing the shaft into a retracted position within the member. In this position, a first portion of the flange contacts one end of the member and a second portion of the flange is spaced from the member. This second portion of the flange has a higher elevation than the first portion and structural means are formed on the interior of the member that prevent rotational movement of the shaft and maintain this orientation. The surface of the second portion of the flange facing the member is an inclined cam surface. The article to be hung is placed in the space between the member and the cam surface. The weight of this article exerts a force on the cam surface that overcomes the force exerted by the resilient means and moves the shaft into the extended position.

Detailed description of the invention

Figure 2:
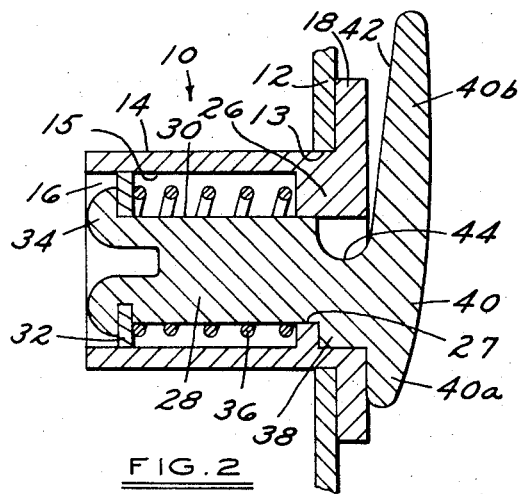
FIGURE 2 is a sectional view taken along the line 2—2 of FIGURE 1 and illustrating the coat hook in the retracted position.

Referring now to the drawings, the numeral 10 denotes the automatically retractable coat hook of this invention particularly useful in the interior of a motor vehicle. An interior trim panel 12 has formed therethrough an aperture 13 through which extends a sleeve-like housing 14 having an internal surface 15 defining a cavity 16. Formed on one end of housing 14 is a flange 18 extending transversely to the longitudinal axis of housing 14 and having formed therethrough holes 20 and 21. Flange 18 contacts panel 12 and is secured thereto by fasteners 22 and 24.

Figure 4:
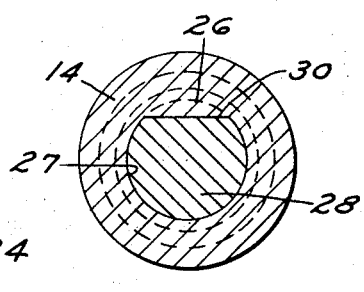
FIGURE 4 is a sectional view taken along the line 4—4 of FIGURE 3.

Extending from interior surface 15 of housing 14 is a shoulder 26 defining a restricted passageway 27 having a non-circular cross-section (FIGURE 4). A shaft 28, having a cross-section similar to passageway 27, extends into cavity 16 and makes a sliding fit with shoulder 26. FIGURE 4 of the drawing illustrates a preferred cross-section of aperture 27. This aperture essentially is a circular opening having one flat segment that mates with flat surface 30 of shaft 28. This arrangement allows axial movement of shaft 28 but prevents rotational movement.

A washer 32 surrounds shaft 28 in cavity 16 and makes a sliding fit with interior surface 15. Washer 32 is held on shaft 28 by means of enlargement 34 formed by staking one end of shaft 28 after the parts heretofore mentioned have been assembled. During this assembly, a compression spring 36 is located in cavity 16 and surrounds shaft 28. Spring 36 bears on shoulder 26 and washer 32 and thus exerts a force tending to separate these two members and biases shaft 28 into cavity 16.

Figure 1:
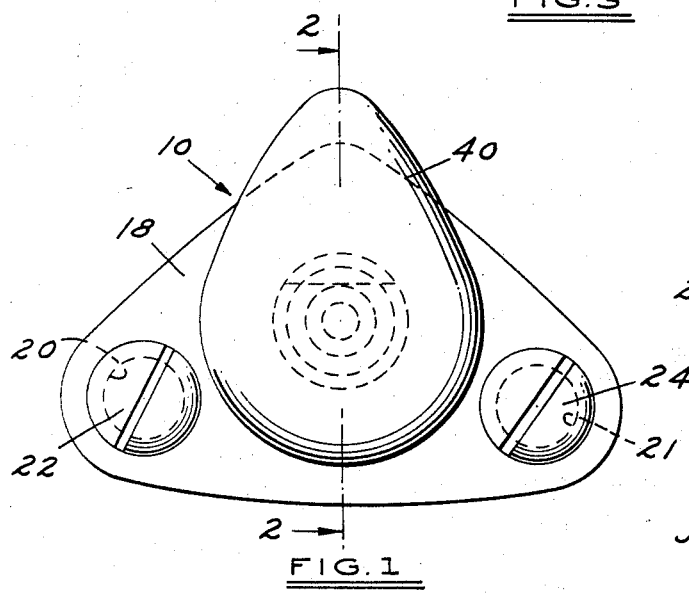
FIGURE 1 is an end elevation view of an automatically retractable coat hook constructed in accordance with this invention.

The extremity of shaft 28 opposite enlargement 34 has formed thereon an integral enlargement 40 having an egg-shaped transverse section (FIGURE 1) and substantially flat outer surface 41.

When not in use, coat hook 10 assumes the retracted position illustrated in FIGURE 2 due to the force of spring 36. In this retracted position, portion 40a of enlargement 40 contacts flange 18, while portion 40b, having a tapered surface 42, is spaced from flange 18. Shaft 28 has formed therein a recess 24 in its top surface adjacent enlargement 40.

Figure 3:
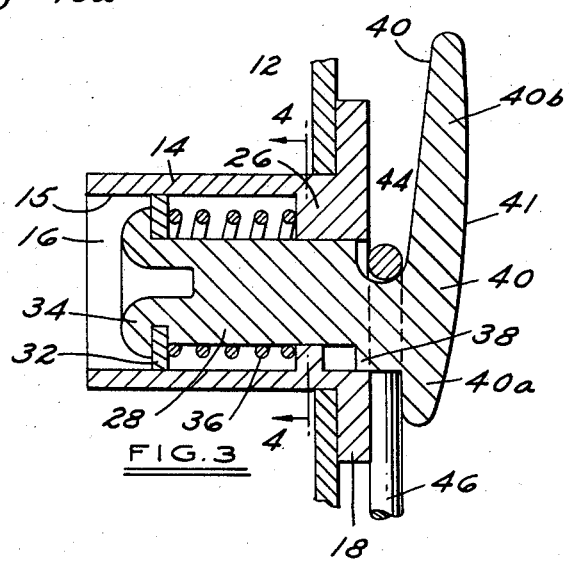
FIGURE 3 is a view similar to FIGURE 2 but illustrating the coat hook in the extended position.

When it is desired to hang an article, such as a coat hanger 46 (FIGURE 3) from coat hook 10, this article is placed in the space between portion 40b of enlargement 40 and flange 18. The weight of article 46 causes a force to be exerted against surface 42 that then acts as a cam surface. This gravity force overcomes the force exerted by spring 36 and urges shaft 28 into the extended position illustrated in FIGURE 3 so that article 46 comes to rest in recess 44 and is securely supported thereon. Of course, upon the removal of article 46, the force of spring 36 returns shaft 28 to the retracted position.

This invention thus provides an automatically retractable coat hook that does not protrude from its supporting structure. The large, substantially flat exterior area of enlargement 40 ameliorates the possibility of penetration into the person of vehicle passengers during the impact of the "second collision," since impact forces are spread over this relatively large area.

It is to be understood that this invention is not limited to the exact construction shown and described above, but that various changes and modifications may be made without departing from the spirit and scope of the invention as defined by the following claim.

What is claimed is:
1. An extensible automatically retractable safety coat hook for use in a motor vehicle having a passenger com- partment partially defined by an interior trim member, said coat hook adapted for supporting an article from said member and including: an elongated housing having internal wall means defining a bore extending along the length of said housing, said housing extending through an aperture in said member and operatively secured against movement to said member; a shoulder extending from said internal wall means proximate one end of said housing and defining a passage of reduced cross-section relative to said bore, said passage having a noncircular cross-section; substantially horizontally positioned elongated slide means movable in said bore and making a sliding fit in said passage, one end of said slide means remote from said one housing end having an enlarged portion extending therefrom; a compression spring located in said bore surrounding said slide means and operatively bearing on said enlarged portion and said shoulder and biasing said slide toward a retracted position within said housing; hook means formed on the other end of said slide means and located exteriorly of said housing, said hook means extending radially outward from said slide means about the entire periphery of the latter, the surface of said hook means remote from said slide means having a substantially smooth surface, a first portion of the surface of said hook means proximate said housing being normally biased by said spring into contact with said housing, the portion of the hook means surface proximate said housing located above said slide means angularly diverging from said housing at a rate directly proportional to the distance from said slide means.

References Cited
UNITED STATES PATENTS

| | | |
|---|---|---|
| 748,541 | 12/1903 | Sullivan. |
| 1,093,556 | 4/1914 | Ferguson. |
| 2,417,036 | 3/1947 | Zelenko _____ 211—96 |
| 3,151,831 | 10/1964 | O'Meara _____ 248—220 |

CHANCELLOR E. HARRIS, *Primary Examiner.*

J. FRANKLIN FOSS, *Assistant Examiner.*

U.S. Cl. X.R.

224—42.45; 248—305